United States Patent [19]

Shekleton et al.

[11] Patent Number: 5,603,513
[45] Date of Patent: Feb. 18, 1997

[54] COMPRESSED NON-ASBESTOS GASKETING FOR STEAM

[75] Inventors: Laura E. Shekleton, Fairport; Richard Dibble, Williamson, both of N.Y.; Agnes Potepan, Reedsville, Pa.

[73] Assignee: Garlock, Inc., New York, N.Y.

[21] Appl. No.: 514,714

[22] Filed: Aug. 14, 1995

Related U.S. Application Data

[63] Continuation of Ser. No. 84,645, Jun. 28, 1993, abandoned.

[51] Int. Cl.[6] ................................................. F16J 15/10
[52] U.S. Cl. ........................................................ 277/227
[58] Field of Search ........................... 277/227, DIG. 6; 524/427, 437, 443, 444

[56] References Cited

U.S. PATENT DOCUMENTS

| | | | |
|---|---|---|---|
| 4,748,075 | 5/1988 | Beyer et al. | 277/DIG. 6 X |
| 4,786,670 | 11/1988 | Tracy et al. | 277/DIG. 6 X |
| 4,818,602 | 4/1989 | Yoshimi et al. | 428/304.4 |
| 4,859,526 | 8/1989 | Potepan et al. | 277/227 X |
| 5,106,790 | 4/1992 | Hashimoto et al. | 501/95 |
| 5,242,871 | 9/1993 | Hashimoto et al. | 501/95 |
| 5,272,198 | 12/1993 | Kaminski et al. | 277/DIG. 6 X |
| 5,306,553 | 4/1994 | Spillner et al. | 428/283 |

FOREIGN PATENT DOCUMENTS 62-129377  6/1987  Japan .

*Primary Examiner*—William A. Cuchlinski, Jr.
*Assistant Examiner*—John L. Beres

[57] ABSTRACT

Compressed non-asbestos gasketing material suitable for use in high temperature applications and particularly for sealing steam and other oxidizing fluids. In a preferred form, the material is characterized by a markedly reduced weight loss at high temperatures as compared to other compressed non-asbestos gasketing materials. The material contains a substantial quantity of sepiolite fiber and a lesser amount of other inorganic fibers such as rock, wool and ceramic.

14 Claims, No Drawings

5,603,513

COMPRESSED NON-ASBESTOS GASKETING FOR STEAM

This application is a continuation of application Ser. No. 08/084,645, filed Jun. 28, 1993 now abandoned.

FIELD OF THE INVENTION

The present invention relates to compressed non-asbestos gasketing material, and more particularly, to such material that is particularly useful in applications which require the sealing of oxidizing fluids.

BACKGROUND OF THE INVENTION

During recent years, much effort has gone into the development of new products of all types to replace asbestos-containing ones which were widely used for many, many years. In particular, a number of such products have been developed in the field of compressed gasketing material and they employ a variety of fibrous reinforcing materials. The process operations for the manufacture of compressed gasketing materials are such that whatever fibers are used, they must have a substantial degree of resistance to fracture and degradation, as well as the chemical and thermal resistance necessary to perform their sealing function. Among the fibers which have been used with varying degrees of success are ones of carbon, graphite, aramid and glass.

In many applications, some of these new gasketing materials have given sealing results equal to or better than those obtained with the asbestos-containing products of the past. However, as compared to compressed asbestos, a common problem with the new gasketing materials has been a failure to give adequate service life in applications which require the sealing of superheated steam, hot air or other oxidizing fluids. When sealing such fluids, these newer materials show a very substantial weight loss at temperatures typical of such sealing applications and along with this weight loss comes early sealing failure. For processing reasons, it has been necessary in some instances to use particulate filler materials in place of some of the fibrous component and this often brings about greater weight loss at high temperatures as well as generally reduced strength.

SUMMARY OF THE INVENTION

The present invention provides a material which not only gives much better performance than other non-asbestos gasketing products, but also provides a very substantial improvement as compared to compressed asbestos gasketing. More specifically, it has been found that if naturally fibrous sepiolite material, alone or in combination with lesser amounts of other high temperature resistant fibers, is used in place of asbestos fibers or any of the various other fibers that have been used recently, one can produce a compressed gasketing material which provides much improved service life in sealing superheated steam or other oxidizing fluids. Furthermore, it has been determined that such gasketing material can be produced in much the same manner and with already existing equipment which has been used to produce compressed asbestos gasketing as well as other non-asbestos gasketing products.

Accordingly, it is a primary object of the invention to provide compressed gasketing material which gives longer service life in sealing superheated steam, hot air or other oxidizing fluids. Another object of the invention is to provide formulations for such materials that allow production to be accomplished with existing equipment and processes. Yet another object is to provide such gasketing materials at costs which are economically competitive in the marketplace. Still another object of the invention is to provide such gasketing material which also meets all of the other generally accepted physical property requirements for good compressed gasketing materials.

In the following detailed description, references to steam and superheated steam should be understood to refer also to hot air and strong oxidizing fluids.

DETAILED DESCRIPTION OF THE INVENTION

The high temperature non-asbestos gasket material of the invention includes a major portion which is a fiber base and a minor portion which is an elastomeric binder. A variety of materials may be used in the fiber base and in the binder and filler materials may be used, details of which are included in the following description of preferred embodiments of the invention.

A first preferred embodiment is made by combining nitrile and natural elastomers with sepiolite and rock wool fibers, fillers, an aromatic solvent and curing materials. These materials are mixed together until the elastomers are solvated and the mixture is thoroughly uniform. The resulting dough-like mixture is then loaded into a standard sheeter for making compressed gasketing sheet material. Preferred sheeters are made by Paul Troester Maschinen Fabrik of Hanover, Germany. When the sheet is complete and all of the excess solvent is driven off, the resulting material comprises about 10.5% nitrile elastomer, 3% natural rubber, 60% sepiolite fiber, 20% rock wool fiber, 4.5% particulate filler and about 1.5% curing materials. A preferred sepiolite fiber having an average fiber length of about 3 mm. is available from Alumina Cement Trading Company of Park Ridge, N.J. under the name Unionlite S-300. A suitable rock wool fiber having an average fiber length of about 650 microns is Lapinus RF21(BB)8 as available from Lapinus Fibers BV of Roermond, Netherlands.

A second preferred embodiment is of a similar composition except that a portion of the rock wool fiber is replaced by ceramic fiber. A suitable ceramic fiber has an average fiber length of about 3 mm and is available from the Carborundum Co. of Niagara Falls, N.Y. under the name Fiberfrax W-758. This sheet, when finished, comprises about 10% nitrile elastomer, 3% SBR elastomer, 65% sepiolite fiber, 13% rock wool fiber, 7.5% ceramic fiber and about 1.5% curing materials.

Experience to date indicates that these and other similar compositions may tend to have rather rough surfaces on the finished sheet. Accordingly, it appears that a preferred construction will likely include a starter coat and a finish coat to improve the sealing performance of the finished gasketing material by providing smoother surfaces. The use of such starter and finish coats is well known in the compressed sheet art and need not be described here in full detail. Suffice to say that these coats are very thin, e.g 0.001" to 0.002", and they have a higher proportion of elastomers and fillers and a lower proportion of fiber.

Other variations in main body composition will be suitable including the use of coloring materials in limited quantities. However, the key to success is to keep weight loss to a minimum when exposed to oxidizing fluids if satisfactory performance and life is to be achieved in sealing high temperature steam and particularly, super heated steam. Table I lists in column 1 a variety of fibers and binders used to make compressed gasketing materials. Columns 2 and 3 show the weight loss for those materials upon exposure to 650° F. for 16 days and upon exposure to 900° F. for 24 hours respectively in hot air. Column 4 shows the length of time in hours to gasket failure when confined in a test flange and exposed to thermal cycling from ambient temperatures to 750° F. at 500 PSI. The first number in Column 4 represents the hours with heat applied and the second number shows the hours with no steam or heat. In

TABLE 1

| Fiber - Binder | % Weight Loss After 16 Days 650° F. In Open Air Oven | % Weight Loss After 24 Hours 900° F. In Open Air Oven | Hours to Failure @ 750° F. and 500 psi Steam |
| --- | --- | --- | --- |
| ASBESTOS - SBR | 10.9 | 12.6 | |
| ASBESTOS - NITRILE | 15.0 | 25.5 | 1065/439 |
| CARBON - SBR | 33.1 | 46.5 | |
| CARBON - NITRILE | 30.5 | 42.9 | |
| GRAPHITE - NITRILE | 18.5 | 25.3 | 985/467 |
| ARAMID - SBR | 29.9 | 41.7 | |
| KEVLAR - NITRILE | 22.8 | 34.5 | 853/662 |
| GLASS - NITRILE | 21.1 | 26.2 | |
| INVENTION - 1 | 15.6 | 16.2 | 1579/1451 |
| INVENTION - 2 | 16.7 | 17.9 | 1131/1172 |
| INVENTION - 3* | 15.1 | 15.8 | 3953/2904+ |

*All samples 1/16" thk except Invention 3 which was 1/32" thk
+Still running when application signed these tests, the typical procedure was to have the steam on during the work week and off on the weekend. When weight loss is less than 20% upon exposure to heat as shown in Columns 2 and 3, much improved gasket life is achieved. When weight loss is greater, gaskets are very apt to fail, often catastrophically which can lead to substantial fluid loss and a risk of physical injury to nearby persons. When weight loss was more than 30% it was deemed not worthwhile to test the material in a pressurized flange.

Of course, it must be kept in mind that any generally acceptable gasketing material must possess other physical characteristics within well known limits in order to provide satisfactory performance and handling. The American Society for Testing of Materials has established numerous test procedures, as have other groups including many gasket manufacturers through the Fluid Sealing Association. Particularly important characteristics are density, compressibility and recovery, torque retention and sealability. Generally accepted values have been established for each of these characteristics and such values are well known to gasket manufacturers and users and thus they need not be discussed in detail here. It is sufficient to state that gasketing sheet according to the invention is well within the accepted limits for such material.

While preferred embodiments of the invention have been shown and described in detail, other modifications will be readily apparent to those skilled in the art of compressed gasketing materials and their manufacture. Thus, the preceding specification should be interpreted as exemplary rather than as limiting and the scope of the invention is defined by the following claims.

We claim:

1. A non-asbestos gasket sheet material having an inorganic fiber content greater than 50% weight of said material and having a weight loss after 16 days at 650° F. of less than 20% and a weight loss after 24 hours at 900° F. of less than 20% said gasket material being substantially free of organic fiber and made by the compressed sheet method.

2. The gasket material of claim 1 in which said fiber content comprises about 80% to 90% by weight of said material and elastomeric binder comprises the remainder of said material.

3. The gasket material of claim 1 which also includes particulate filler material.

4. The gasket material of claim 1 in which said fiber content comprises from 50% to 90% of said material, elastomeric binder comprises from 10% to 20% of said material and particulate filler materials comprise the remainder of said material.

5. The gasket material of claim 1 which further includes a starter coat.

6. The gasket material of claim 5 which further includes a finish coat.

7. A non-asbestos sheet gasket material suitable for sealing high temperature steam and oxidizing fluids and comprising a body which includes:

a. an inorganic fiber base formed primarily of sepiolite fibers and b. an elastomeric binder;

said gasket material having a weight loss after 16 days at 650° F. of less than 20% and a weight loss after 24 hours at 900° F. of less that 20% and said gasket material being substantially free of organic fiber and made by the compressed sheet method.

8. The gasket material of claim 7 in which:

a. said fiber base comprises about 80% to 90% by weight of said body and b. said elastomeric binder comprises the remainder of said body.

9. The gasket material of claim 7 which also includes particulate filler material.

10. The gasket material of claim 9 in which:

a. said fiber base comprises from 60% to 90% by weight of said body, b. said elastomeric binder comprises from 10% to 20% by weight of said body and c. said particulate filler materials comprise the remainder of said body.

11. The gasket material of claim 7 which further includes a starter coat.

12. The gasket material of claim 11 which further includes a finish coat.

13. The gasket material of claim 7 in which said fiber base comprises from about 50% to 90% sepiolite fiber and from about 10% to 40% rock wool fiber.

14. The gasket material of claim 13 which further includes about 1% to 15% ceramic fiber.

* * * * *